(12) United States Patent
Matsuyama

(10) Patent No.: US 6,344,845 B1
(45) Date of Patent: Feb. 5, 2002

(54) POSITION INPUTTING DEVICE AND VIDEO SIGNAL PROCESSING APPARATUS

(75) Inventor: Makoto Matsuyama, Kanagawa (JP)

(73) Assignee: Sony Corporation (JP)

( * ) Notice: Subject to any disclaimer, the term of this patent is extended or adjusted under 35 U.S.C. 154(b) by 1055 days.

(21) Appl. No.: 08/506,645

(22) Filed: Jul. 25, 1995

(30) Foreign Application Priority Data

Jul. 29, 1994 (JP) .............................................. 6-178207

(51) Int. Cl.⁷ ................................................. G09G 5/08
(52) U.S. Cl. ...................................... 345/157; 345/161
(58) Field of Search ................................ 345/157, 161, 345/163, 156, 158, 159, 160, 162, 164, 165, 166, 167, 168, 169, 179, 173

(56) References Cited

U.S. PATENT DOCUMENTS

| | | | |
|---|---|---|---|
| 5,175,534 A | | 12/1992 | Thatcher |
| 5,298,919 A | * | 3/1994 | Chang ......................... 345/163 |
| 5,438,331 A | * | 8/1995 | Gilligan et al. .............. 345/168 |
| 5,446,481 A | * | 8/1995 | Gillick et al. ................ 345/163 |
| 5,481,265 A | * | 1/1996 | Russell ........................ 345/157 |
| 5,512,892 A | * | 4/1996 | Corballis et al. ............ 345/161 |
| 5,541,622 A | * | 7/1996 | Engle et al. ................. 345/161 |

FOREIGN PATENT DOCUMENTS

JP          1244522        9/1989

OTHER PUBLICATIONS

Super Paint, 1988 Silicon Beach Software, Inc., p 15.*

* cited by examiner

Primary Examiner—Xiao Wu
(74) Attorney, Agent, or Firm—Rader, Fishman & Grauer PLLC; Ronald P. Kananen

(57) ABSTRACT

A video signal processing apparatus for processing input video signals in a pre-set manner. An operating lever 1 may be actuated in arbitrary two-dimensional directions. A two-directional position detector 2 detects coordinate data from the amount of two-dimensional movement of the operating lever. If a button switch 3 is not pressed, a control circuit 4 derives the two-dimensional information for specifying a position on the video signal from the coordinate data and outputs the resulting two-dimensional information. If the button switch 3 is not pressed, the control circuit 4 derives the one-dimensional information other than the two-dimensional information from the coordinate data and outputs the resulting one-dimensional data. A picture processing unit 7 processes the input video signal in a pre-set manner based upon the two-dimensional information or the one-dimensional information from the control circuit 4. The video processing apparatus may be improved in operability because the two-dimensional information and the one-dimensional information may be produced by a simplified construction.

15 Claims, 6 Drawing Sheets

POSITION INPUTTING DEVICE AND VIDEO SIGNAL PROCESSING APPARATUS

BACKGROUND OF THE INVENTION

This invention relates to a video signal processing apparatus for processing input video signals in a pre-set manner.

In a position inputting device in which a position in a space is optionally set by a user and entered in a picture inputting device, or a positioner used in a so-called video switcher, it is a routine practice to enter displacement of an optional position in a space in bi-axial directions.

On the other hand, with a positioner used in a position inputting device for instructing and entering a three-dimensional position in a video signal processing apparatus, such as a special effects device, it is possible to enter displacement in tri-axial directions at one time.

For operating on the (X, Y) position of a so-called pattern key indicating the picture inputting position and the input picture size, or the (X, Y) position of a so-called auto-chroma key and the input picture range, by the position inputting device employed in a picture inputting device, it is necessary to set the two-dimensional position by operating an operating lever configured for entering the (X, Y) position and to set the input picture size or range using an operating button, such as a so-called volume knob, moved in a direction different from the direction in which the operating lever is moved. However, the operation is extremely difficult to perform since the operating direction of the operating lever differs from that of the operating button.

OBJECT AND SUMMARY OF THE INVENTION

It is therefore an object of the present invention to provide a video signal processing apparatus in which the two-dimensional information for specifying a position on, for example, video signals, and the one-dimensional information other than the two-dimensional information, may be obtained by a simplified configuration for assuring improved operability.

It is another object of the present invention to provide a position inputting device applied to such a video signal processing apparatus.

The position inputting device of the present invention has operating means, two-dimensional position detection means, a switch and control means.

The operating means of the position inputting device of the present invention is actuated in arbitrary two-dimensional directions. The two-dimensional position detection means detects the two-dimensional operating positions of the operating means. If the switch is not pressed, the control means outputs the operating position detected by the two-dimensional detecting means as the two-dimensional information. If the switch is pressed, the control means outputs the operating position as the one-dimensional information.

The video processing apparatus according to the present invention has operating means, two-dimensional position detection means, a switch, control means and picture processing means.

The operating means of the video signal processing apparatus of the present invention is actuated in arbitrary two-dimensional directions. The two-dimensional position detection means detects coordinate data specifying the amount of two-dimensional movement of the operating means. If the switch is not pressed, the control means produces the two-dimensional information from the coordinate data detected by the two-dimensional position detection means and outputs the two-dimensional information. If the switch is pressed, the control means produces the one-dimensional information from the coordinate data and outputs the produced one-dimensional information. The picture processing means processes the input video signal in a pre-set manner based upon the two-dimensional information or the one-dimensional information from the control means.

With the position inputting device according to the present invention, since the coordinate data produced on the basis of the amount of movement of operating means by the two-dimensional position detection means may be converted responsive to actuation of the switch into the one-dimensional information other than the two-dimensional information, the operating means may be used in common for producing the two-dimensional information and the one-dimensional information other than the two-dimensional information, as a result of which the position inputting device may be improved in operability despite its simplified construction. On the other hand, an inexpensive position inputting device may be provided since no complex mechanism is utilized for converting the amount of movement.

With the video signal processing apparatus according to the present invention, since the coordinate data produced on the basis of the amount of movement of operating means by the two-dimensional position detection means may be converted responsive to actuation of the switch into two-dimensional information other than the one-dimensional information, such as the information specifying the range of the arbitrary processing of the video signal, the operating means may be used in common for producing the two-dimensional information and the one-dimensional information other than the two-dimensional information, as a result of which the video signal processing apparatus may be improved in operability by a simplified construction. On the other hand, an inexpensive video signal processing apparatus may be provided since no complex mechanism is utilized for converting the amount of movement.

DESCRIPTION OF THE PREFERRED EMBODIMENTS

Figure 1:
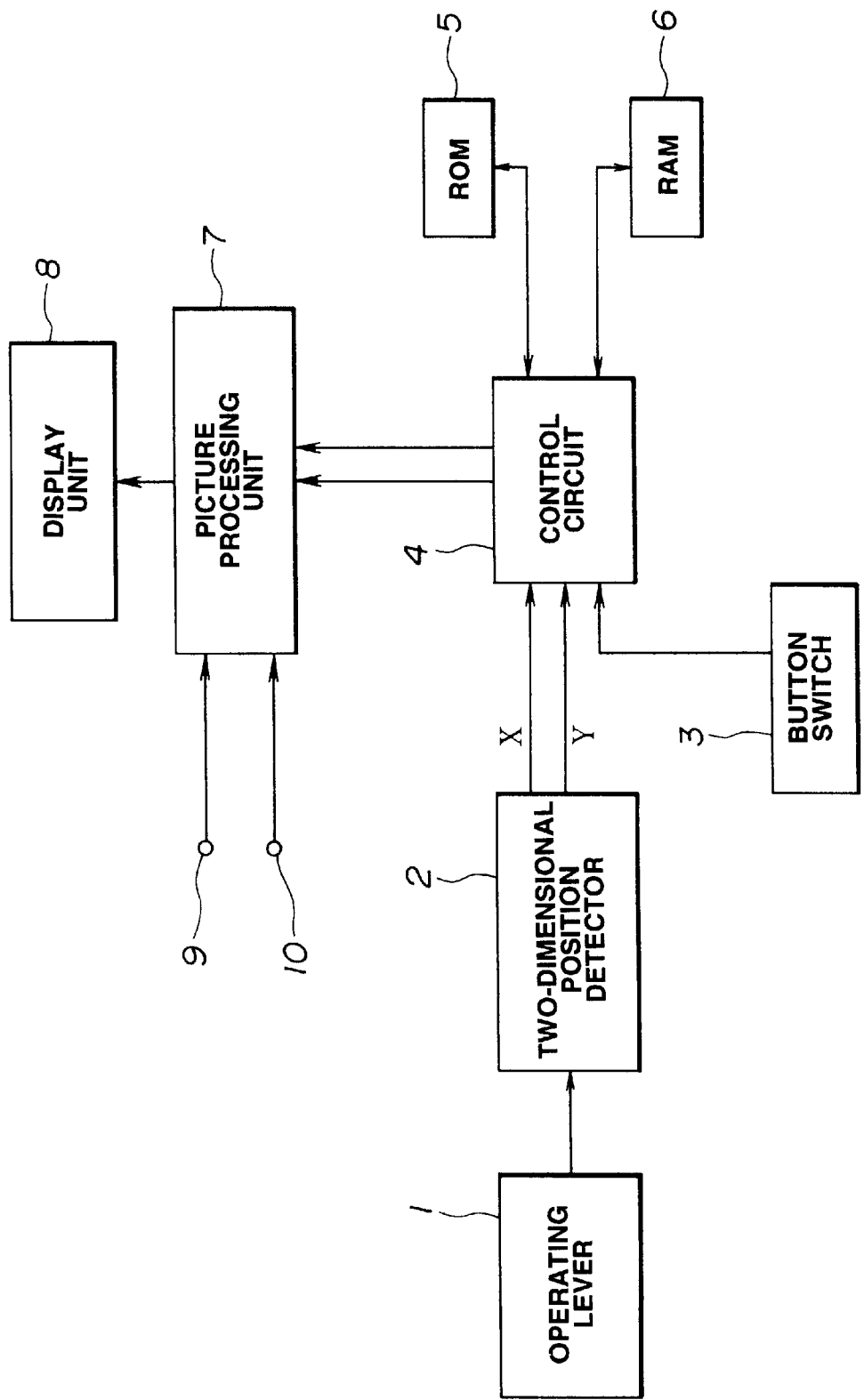
FIG. 1 is a block diagram showing an illustrative configuration of a video signal processing apparatus according to the present invention.

Referring to the drawings, preferred embodiments of the position inputting device and the video signal processing apparatus according to the present invention will be explained in detail.

The video signal processing apparatus includes an operating lever 1, a two-dimensional position detector 2, a button switch 3, a control circuit 4, a picture processing unit 7 and a display unit 8, as shown in FIG. 1.

In the above video signal processing apparatus, the operating lever 1 is mounted on the two-dimensional position detector 2 so as to be leveled obliquely or to a horizontal or upstanding position by the user as he or she views the picture on the display unit 8. The operating lever 1 is fitted with a voltage generating unit for generating a voltage in the X-direction and a voltage in the Y-direction in a two-dimensional plane so that the voltage corresponding to tilt of the operating lever 1 is outputted from the voltage generating unit 5. If the operator releases the operating lever 1 after he or she has moved the operating lever 1 to an arbitrary position, the operating lever 1 is automatically returned to a central standby position. During this time interval, no voltage is outputted.

The two-dimensional position detector 2 detects, based upon the voltage corresponding to the tilt of the operating lever 1, the direction in which the operating lever 1 has been moved on the two-dimensional plane, referred to herein as the operating direction, and the amount of movement in the operating direction, and generates coordinate data X, Y from the amount of movement and the operating direction. The generated coordinate data X, Y are sent to the control circuit 4. The operating direction means the direction proceeding from a position of the operating lever 1 before start of the movement, referred to herein as the initial position, to a position of the operating lever 1 after the end of the movement. For effecting switching between the two-dimensional position and the one-dimensional position as later explained, the button switch 3 is pressed by the user and the button switch 3 transmits a pressing signal, that is a signal specifying whether or not the button switch 3 has been pressed, to the control circuit 4.

The control circuit 4 has a read-only memory (ROM) 5 and a random access memory (RAM) 6, and processes the coordinate data and the pressing signal from the two-dimensional position detector 2 and the button switch 3, in accordance with the information stored in the ROM 5 and the RAM 6, in order to send the resulting data to the picture processing unit 7.

If the pressing signal specifying that the button switch 3 has not been pressed is entered, the above-mentioned coordinate data from the two-dimensional position detector 2 is directly sent as the two-dimensional information specifying the coordinates. If the pressing signal specifies that the button switch 3 has been pressed, only the Y-value of the coordinate data is sent as the one-dimensional information to the picture processing unit 7.

Figure 2:
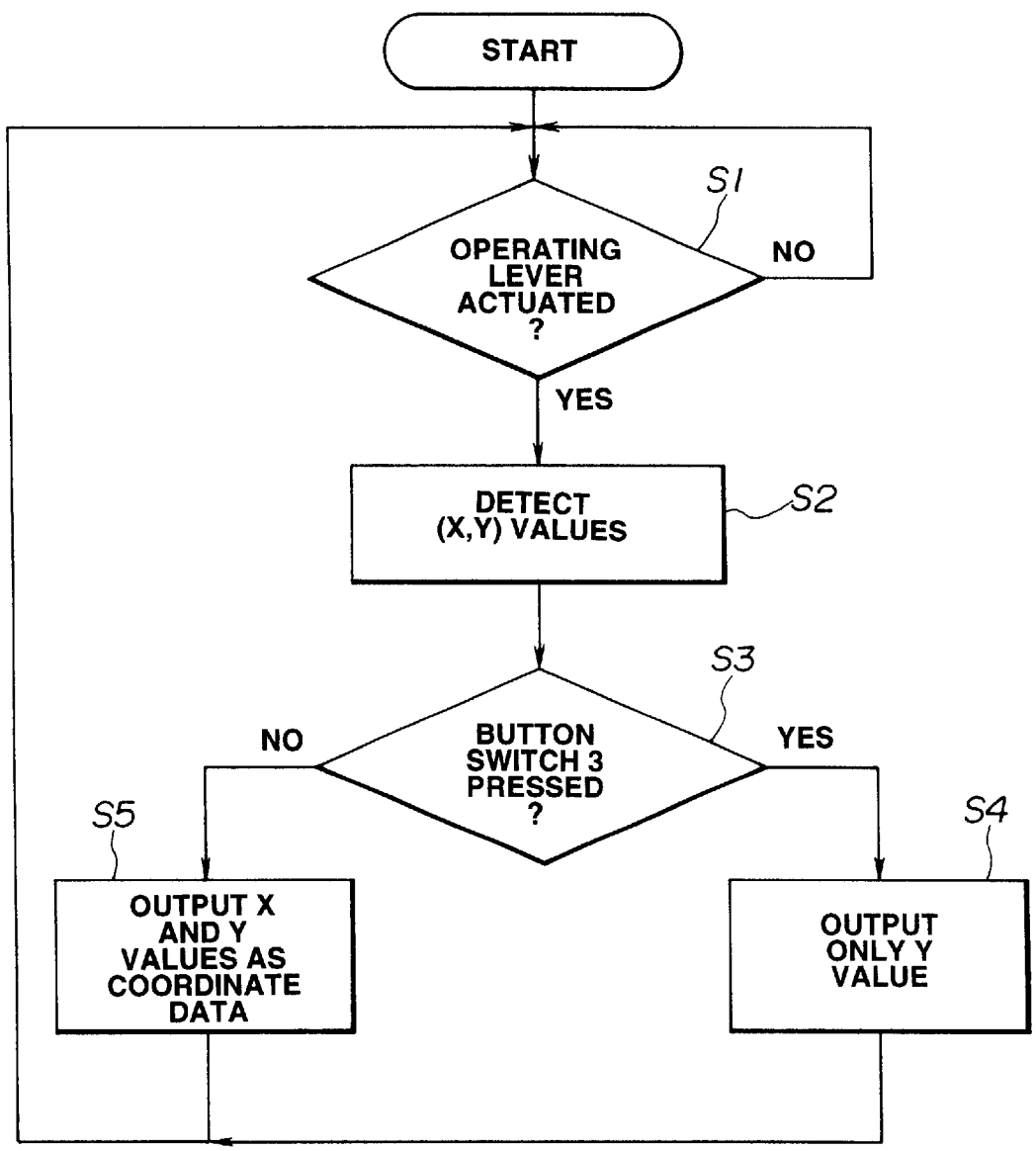
FIG. 2 is a flow chart for illustrating the operation of a position inputting device constituting the video signal processing apparatus.

An example of the above operations is explained by referring to a flow chart shown in FIG. 2.

At step S1, it is judged whether or not the operating lever 1 has been actuated. If the result of judgment is NO, that is if the operating lever 1 has not been actuated, processing of the control circuit 4 reverts to step S1 in order to repeat the step until actuation of the operating lever 1. If the result of judgment at step S1 is YES, that is if the operating lever 1 has been actuated, the processing transfers to step S2.

At step S2, the values of (X, Y) specifying the amount of actuation of the operating lever 1, that is the coordinate data, is detected. The processing then transfers to step S3. At step S3, it is judged whether or not the button switch 3 has been pressed. If the result of judgment is NO, that is if the button 3 has not been pressed, the processing transfers to step S5 where the coordinate data are outputted as the two-dimensional data. The processing then reverts to step S1. If the result of judgment at step S3 is YES, that is if the button switch 3 has been pressed, the processing transfers to step S4 where only the value of Y, for example, is outputted as the one-dimensional information among the above-mentioned coordinate data. The processing then reverts to step S1.

Returning to FIG. 1, the picture processing unit 7 performs pre-set processing, such as mosaicking, on picture signals entering a foreground picture input terminal 9 and a background picture input terminal 10, as later explained, based upon the two-dimensional information or the one-dimensional information transmitted from the control circuit 4, and outputs the resulting picture information to the display unit 8.

The display unit 8 is a picture display unit, such as a liquid display device or CRT, and displays a picture based upon picture signals transmitted from the picture processing unit 7.

The position inputting device, made up of the operating lever 1, two-dimensional position detector 2, button switch 3 and the control circuit 4, is now explained. The position inputting device represents an essential portion of the above-described video signal processing apparatus.

Figure 3:
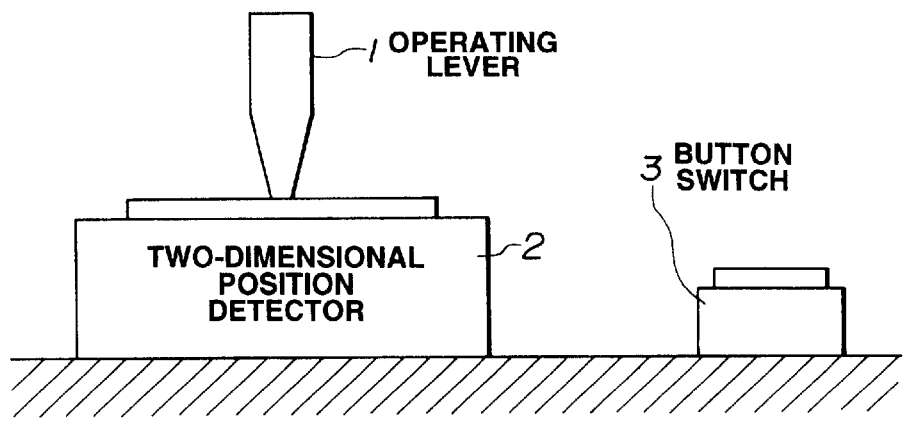
FIG. 3 is a front view showing the position inputting device.
Figure 4:
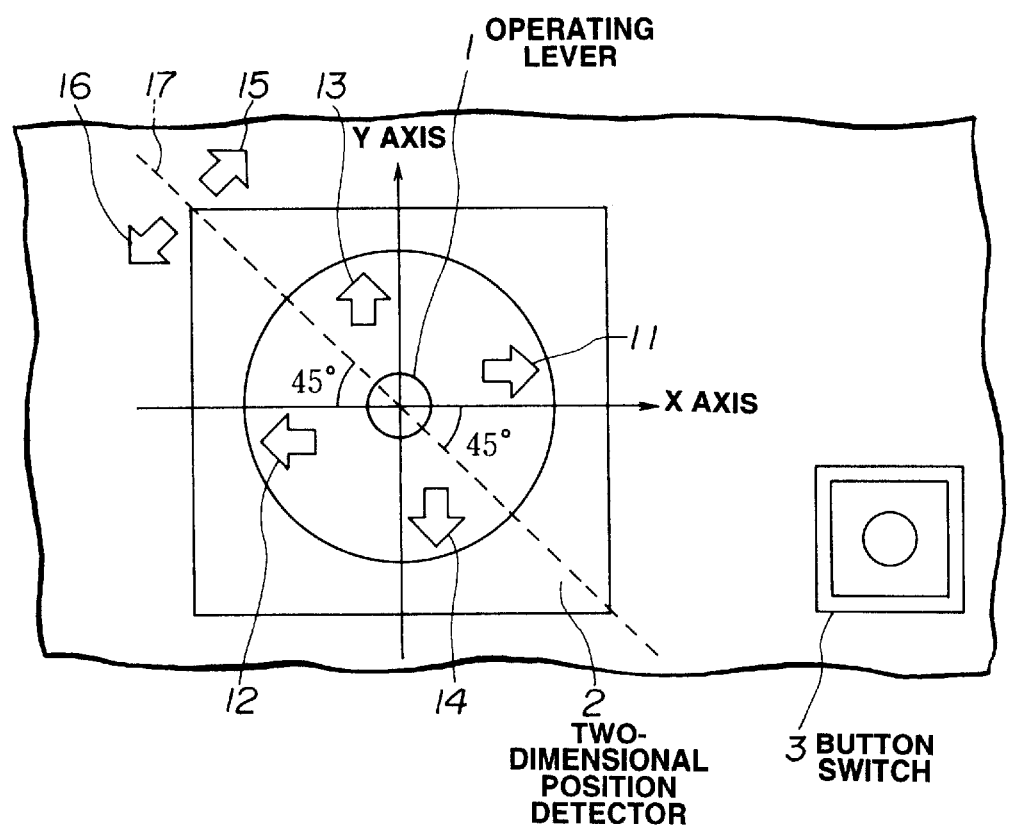
FIG. 4 is a plan view showing the position inputting device.

FIGS. 3 and 4 are a side view and a top plan view of the position inputting device, respectively. It is noted that, on the X-axis and the Y-axis in FIG. 4, the positive directions are the directions pointing towards right and towards above, respectively, and that an axis 17 is obtained on rotating the X-axis by −45° with the operating lever 1 as the origin.

In the position inputting device, the operating lever 1 is mounted on the two-dimensional position detector 2 as described above, while the button switch 3 is mounted on the same plane as the plane on which the two-dimensional position detector 2, for example, is mounted.

If the operating lever 1 is moved without the button switch 3 being pressed, the control circuit 4 outputs the coordinate data as the two-dimensional information.

It is now assumed that the button switch 3 has been pressed and the operating lever 1 is moved.

In such case, the one-dimensional information is outputted. First, the case of generating the one-dimensional information using only the X-component is explained. If the operating lever 1 is moved in a direction shown by arrows 11 or 12, as shown in FIG. 4, the control circuit 4 generates and outputs (x+r) as the one-dimensional information, where (x) denotes an X-component of coordinate data from the two-dimensional position detector 2, that is the initial position, and "r" denotes the amount of movement in the X-axis which is positive or negative when the operating lever 1 is moved in a direction shown by arrow 11 and in a direction shown by arrow 12, respectively.

Next, the case in which the one-dimensional information is generated using only the Y-component is explained. If the operating lever 1 is moved in a direction shown by arrow 13 or 14, the control circuit 4 generates and outputs (y+q) as the one-dimensional information, where "q" denotes the amount of movement in the Y-axis which is positive or negative when the operating lever 1 is moved in a direction shown by arrow 13 and in a direction shown by arrow 14, respectively.

If the operating lever 1 is moved in an arbitrary direction within a two-dimensional plane, only the X-component or the Y-component of the coordinate data sent from the two-dimensional position detector 2 is taken out and outputted as the one-dimensional information.

The X-component and the Y-component of the amount of movement may be summed together, or only the X-component or the Y-component, whichever is larger, may be taken and used as the one-dimensional information. The amount of movement may be set so that it is increased or decreased when the operating lever 1 is moved in a direction shown by arrow 15 or in a direction shown by arrow 16 with respect to the axis 17, respectively.

The sign of the X-axis or that of the Y-axis or the relation of increase or decrease of the amount of movement in the operating direction may be reversed from those described above.

Figure 5:
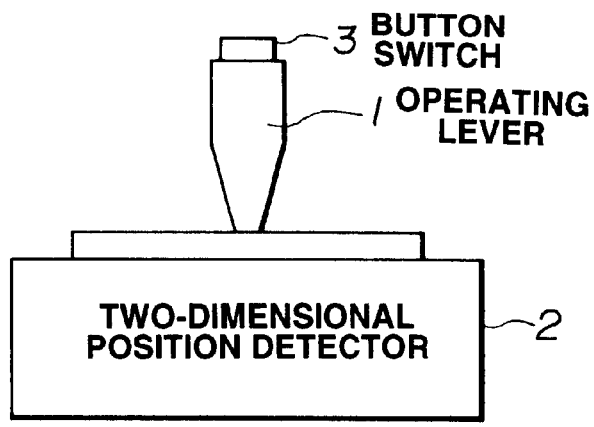
FIG. 5 is a front view showing a modification of the position inputting device according to the present invention.

As a modification of the position inputting device, the button switch 3 may be integrally mounted on the operating lever 1 which is then mounted on the two-dimensional position detector 2 as shown in FIG. 5.

However, with the constitution shown in FIG. 5, the wiring connection to the button switch 3 traverses the movable portion of the operating lever 1, thus complicating the structure and raising the cost.

Although only the Y-axis component is outputted as the one-dimensional information from the position inputting device as the coordinate data specifying the operating position-on pressing the button switch 3, this is not limitative and only the X-axis component may be outputted as the one-dimensional information.

A typical application of the above-described video signal processing apparatus is mosaicking.

Figure 6:
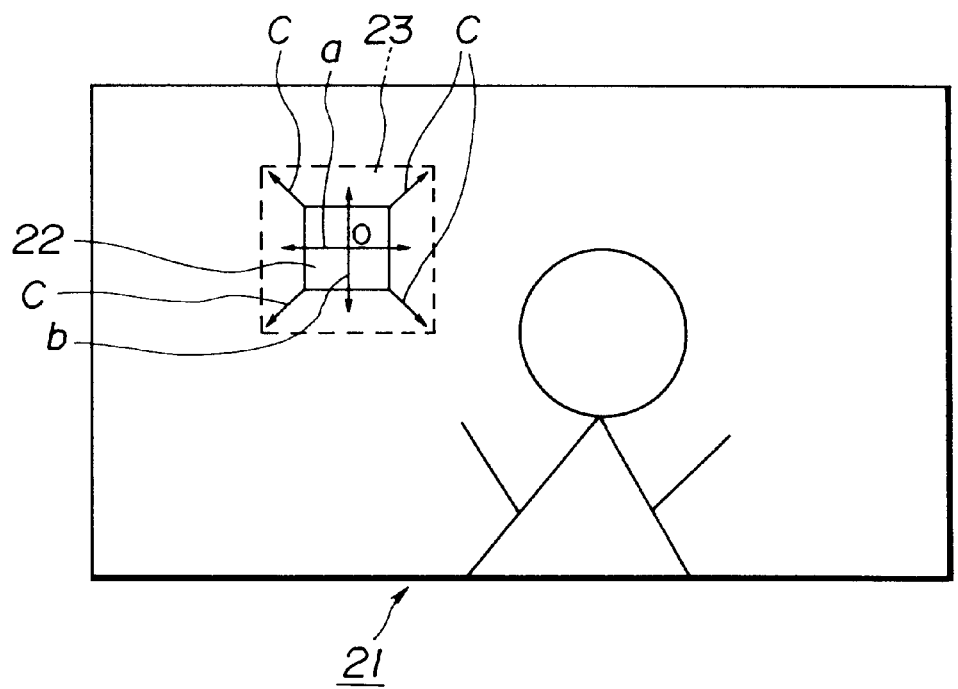
FIG. 6 shows a typical display picture surface of a display unit of the video signal processing apparatus.

The mosaicked picture has its plural pixels in a display picture 21 mosaicked, as shown in FIG. 6. The region to be mosaicked is indicated in FIG. 6.

Figure 7:
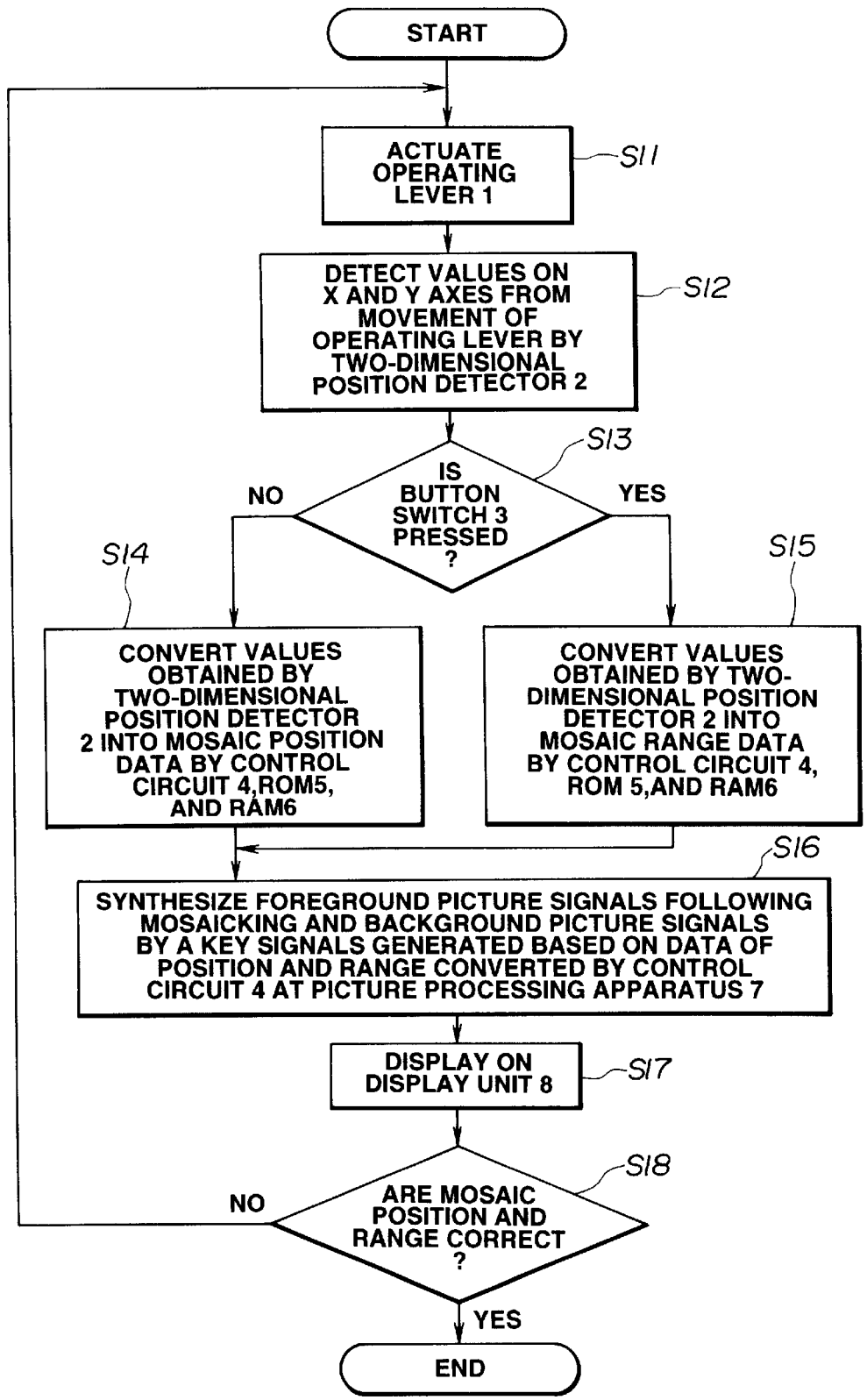
FIG. 7 is a flow chart for illustrating the video signal mosaicking processing as a typical operation of the video signal processing apparatus.

The mosaicking operation is shown in a flow chart of FIG. 7.

In FIG. 7, the operating lever 1 is actuated at step S11. The processing at the control circuit 4 then transfers to step S12.

At step S12, the values (x, y) on the two-dimensional X and Y-axes are detected by the two-dimensional position detector 2 based upon the movement of the operating lever 1. The processing then transfers to step S13 where it is judged whether or not the button switch 3 has been pressed.

If the result of judgment at step S13 is NO, that is if the button switch 3 has not been pressed, the processing transfers to step S14 where the picture processing unit 7 shown in FIG. 7 generates, based upon the two-dimensional information from the control circuit 4, a key signal providing a coordinate corresponding to a position o of a region 22 shown in FIG. 6 is produced. The processing then transfers to step S16.

If the result of judgment at step S13 is YES, that is if the button switch 3 has been pressed, the processing transfers to step S15 where the picture processing unit 7 generates, based upon the one-dimensional information from the control circuit 4, a modified key signal which enlarges the mosaic range, that is the region 22 shown in FIG. 6, in a direction shown by arrows c, based upon the one-dimensional information from the control circuit 4. The processing then transfers to step S16.

At step S16, the processing for mosaicking is carried out by the picture processing unit 7 on the foreground picture signals entering the foreground picture input terminal 9, at the same time as the foreground picture signals are synthesized with background picture signals entering the background picture input terminal 10. The processing then transfers to step S17.

At step S17, a picture by the picture signals synthesized by the picture signal processing unit 7 is displayed. The processing then transfers to step S18. At step S18, the user views the picture in order to judge whether or not the region 22 indicating the picture portion to be mosaicked is of the correct position or range. If the result of judgment is NO, that is if the region 22 is not of the correct position or range, the processing reverts to step S11. If the result of judgment is YES, that is if the region 22 is of the correct position or range, the processing for mosaicking comes to a close.

Figure 8:
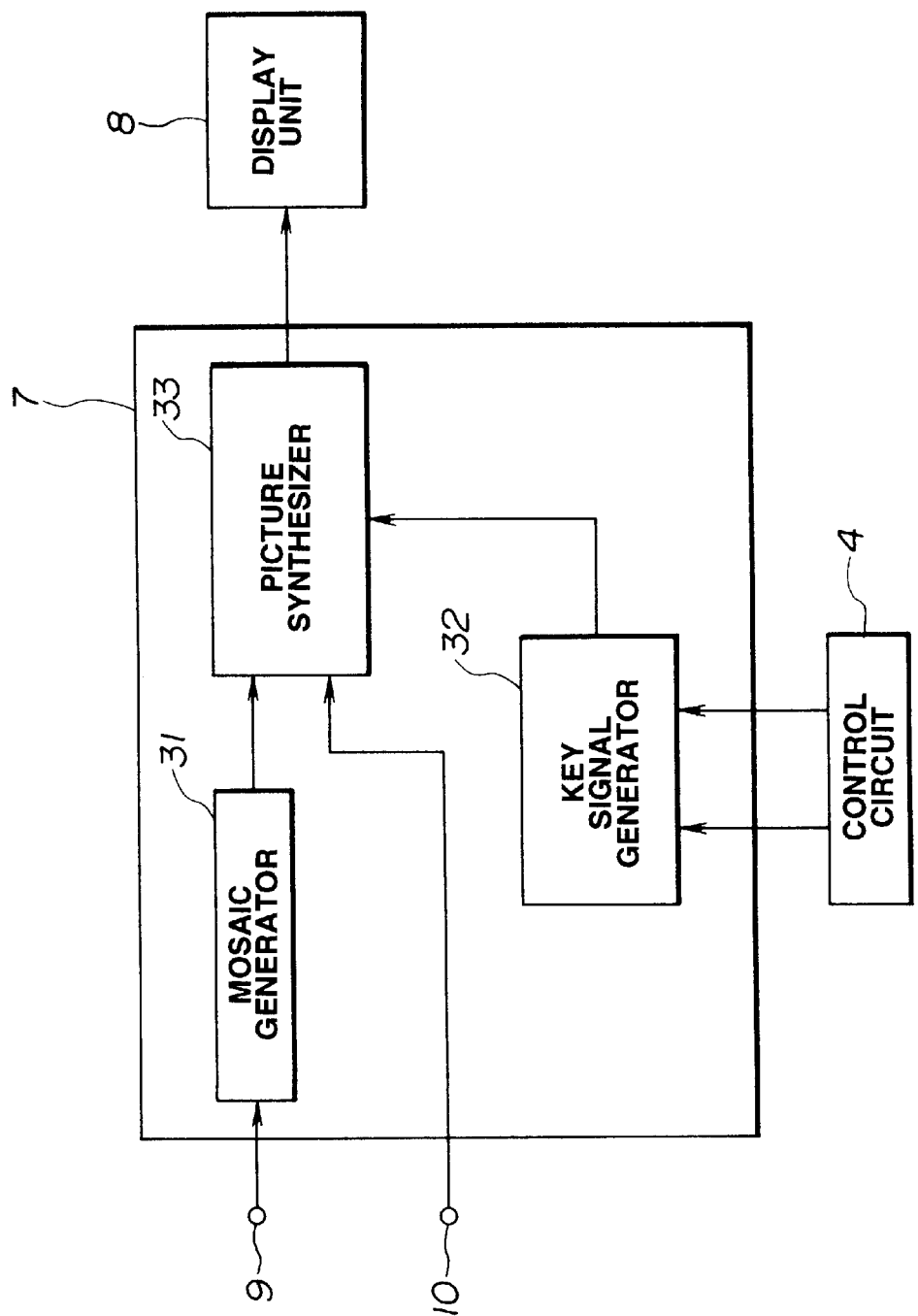
FIG. 8 is a block diagram showing a configuration of a picture processor constituting the video signal processing apparatus.

FIG. 8 shows an illustrative constitution of the picture processing unit 7 for carrying out the processing for mosaicking.

The operations corresponding to the steps S14 to S16 of the flow chart shown in FIG. 7 are executed in the picture processing unit 7. In the description to follow, the operations corresponding to the step number are indicated by corresponding step numbers encircled in brackets.

A mosaic generator 31 performs the processing for mosaicking on the entire region of the foreground picture signals entering the foreground picture input terminal 9. The mosaicked picture signals are sent to a picture synthesizer 33.

A key signal generator 32 generates the key signal based upon mosaic position or range data from the control circuit 4 (steps S14 and S15).

The picture synthesizer 33 selects, by switching, the foreground picture signals from the mosaic generator 31 or the background picture signals from the background picture input terminal 10, in order to synthesize the background picture signals and the mosaicked foreground picture signals, and outputs the resulting picture signals at the display unit 8 (step S16).

The display unit 8 operates, based upon output picture signals of the picture synthesizer 33, to display a picture such as a display picture 21 shown in FIG. 6.

With the above-described picture processing apparatus 7, when the two-dimensional information enters the key signal generator 32 from the control circuit 4, the key signal generator 32 generates, based upon the two-dimensional information, a key signal whose center position is the position represented by the two-dimensional information. On the display picture 21, the mosaicked picture portion is moved with movement of the center position of the key signal.

On the other hand, if the one-dimensional information enters the key signal generator 32 from the control circuit 4, the key signal generator 32 changes the size of the range specified by the key signal at a pre-set speed based upon the value of the one-dimensional information. On the display picture 21, the mosaicked picture portion is enlarged with enlargement of the key signal. The rate of enlargement depends upon the value of the one-dimensional information, that is upon the movement of the operating lever 1.

With the above-described video signal processing apparatus, if the user levels the operating lever 1 in a direction indicated by arrow 11, that is towards the right, without pressing the button switch 3 shown in FIGS. 3 and 4, the region 22 of FIG. 6 is moved towards the right. If the user levels the operating lever 1 in a direction indicated by arrow 12, that is towards the left, the mosaicked portion is moved towards left. If the user levels the operating lever 1 in a direction indicated by arrow 13, that is towards above, or in a direction indicated by arrow 14, that is towards below, the mosaicked portion is moved towards above or towards below, respectively. Such movement of the mosaicked portion in the vertical or horizontal direction is continued until the user terminates to move the operating lever 1 as described above.

On the other hand, if the user has pressed the button switch 3 and moved the operating lever 1 in the direction indicated by arrow 13 in FIG. 4, that is towards above, the apices of the region 22 are moved in the direction indicated by arrows c, that is in a direction away from the center position o, as shown in FIG. 6. Thus the region 22 is enlarged to a region 23, so that the mosaicked portion is enlarged responsive to the operation of the operating lever 1. On the other hand, if the button switch 3 is pressed and the operating lever 1 is moved in the direction indicated by arrow 14 in FIG. 4, that is towards below in FIG. 4, the apices of the region 22 are moved towards the center position and contracted in size, although not shown. Thus the mosaicked portion is contracted in size responsive to the operation of the operating lever 1. Similarly to the movement in the vertical or horizontal direction, described above, the movement of the mosaicked portion in the enlarging or contracting direction is sustained until the user terminates the operation of shifting the operating lever 1.

Although the present invention is applied in the illustrated embodiment to the operation of mosaicking a picture, it may also be applied to the operation of a so-called key framing in, above all, a special effect device in a video signal processing apparatus. That is, coordinate data are outputted in a two-dimensional position detector responsive to the movement of the operating lever. If the button switch is not pressed, the key signal generator is responsive to the two-dimensional information from the control circuit to generate a key signal, with the key frame being moved in the vertical or horizontal direction. If the button switch is pressed, it suffices to actuate the key signal generator for generating the key signal for actuating the key frame in the Z-axis direction based upon the one-dimensional information from the control circuit.

The present invention may also be applied to actuation of a key signal in, for example, a video switcher. That is, the coordinate data are outputted at the two-dimensional position detector responsive to the movement of the operating lever. If the button switch is not pressed, the key signal generator causes the center of the key signal to be moved in the vertical or horizontal directions based upon the above-mentioned two-dimensional information. If the button switch is pressed, it is sufficient if the key signal generator causes the amplitude of the key signal to be changed based upon the one-dimensional information.

The present invention may also be applied to actuation of an automatic chroma key in a video switcher. If the button switch is not pressed, the key signal generator causes the automatic chroma key to be moved in the vertical or horizontal direction based upon the two-dimensional information. If the button switch is pressed, it is sufficient if the size of the sampling range of the automatic chroma is set based upon the above-mentioned one-dimensional information.

Thus, with the above-described video signal processing apparatus, if the user shifts the operating lever without pressing the switch, the center of the key signal may be moved in the vertical or horizontal direction based upon the amount of the shifting movement. If the user shifts the operating lever while pressing the switch, the key signal on the display picture may be enlarged or contracted based upon the amount of the shifting movement. Since the two-dimensional information and the one-dimensional information may be produced by the sole operating lever 1, it becomes possible to improve operability with a smaller number of component parts.

If the button switch is provided on the operating lever, the above-described operation may be easily performed with one hand thus further improving the operability.

Although the operating part of the position inputting device in the illustrated embodiment is the operating lever, this is not limitative and the operating lever may be replaced by any component capable of pointing a spatial position, such as a track ball or a cursor key. In addition, although the switch is a button switch, this again is not limitative and similar effects may naturally be derived using alternative switch means.

In addition, with the illustrated embodiment, the rightward direction is positive for the X-axis and the upward direction is positive for the Y-axis. This similarly is not limitative and the rightward direction may be used as being negative for the X-axis and the upward direction may be used as being negative for the Y-axis.

Furthermore, the operation of a key frame in the special effects device or the operation of the pattern key or the automatic chroma key for the video switcher have been enumerated as operating examples of the video signal processing apparatus, this also is not limitative and the present invention may be applied to operations related to the coordinates in two mutually perpendicular axes, that is to operations concerning the two-dimensional information determining the positions on a planar surface or operation requiring the one-dimensional information.

What is claimed is:

1. A position inputting device for use with video signal processing, comprising:

operating means movable in arbitrary directions;

two-dimensional position detection means for detecting the operating positions of said operating means and generating two-dimensional first and second coordinate data;

a switch;

control means for switching said operating position between two-dimensional first and second coordinate data and one-dimensional coordinate data, responsive to first and second actuating states of said switch, respectively; and picture processing means for moving a predetermined position of video signals within a picture based on the first and second coordinate data when said switch is in the first state and for altering a range of positions of the video signals within the picture based on the one-dimensional coordinate data when the switch is in the second state.

2. The position inputting device as claimed in claim 1, wherein said operating means is operated in arbitrary two-dimensional directions and wherein said position detection means detects the amount of operation of said operating means as two mutually perpendicular components.

3. The position inputting device as claimed in claim 1, wherein said switch is provided in said operating means of said position inputting means.

4. The position inputting device as claimed in claim 1, wherein said switch is provided at a position physically different from said operating means.

5. A video signal processing apparatus comprising:

operating means movable in arbitrary directions;

two-dimensional position detection means for detecting the operating positions of said operating means;

a switch;

control means for switching said operating position between two-dimensional information and one-dimensional information responsive to an actuating state of said switch; and picture processing means for processing input video signals in a pre-set manner responsive to the two-dimensional information/one-dimensional information outputted by said control means;

wherein the picture processing means converts two-dimensional information from the two-dimensional position detection means into position data of input video signals and converts one-dimensional information from the two-dimensional position detection means into range data of the input video signals.

6. The video signal processing apparatus as claimed in claim 5, wherein the position data comprises a position within a picture for a center point of the video signals.

7. The video signal processing apparatus as claimed in claim 5, wherein the range data of the input video signals comprises a range of positions within a picture for the video signals.

8. The video signal processing apparatus as claimed in claim 5, further comprising a display unit for displaying the video signals with a second set of video signals.

9. The video signal processing apparatus as claimed in claim 8, wherein the position data comprises a position within the second set of a video signals for displaying a center point of the video signals.

10. The video signal processing apparatus as claimed in claim 8, wherein the range data of the input video signals comprises a range of positions within the second set of video signals for displaying the video signals.

11. The video signal processing apparatus as claimed in claim 5, wherein the picture processing means includes:

a key signal generator for converting the two-dimensional information into the position data and for converting the one-dimensional information into the range data;

a mosaic generator for mosaicking the video signals; and a picture synthesizer for combining the video signals with a second set of video signals.

12. The video signal processing apparatus as claimed in claim 11, wherein the video signals received by the mosaic generator comprise a foreground picture and the second set of video signals received by the picture synthesizer comprise a background picture.

13. The video signal processing apparatus as claimed in claim 5, wherein the operating means comprises a lever.

14. The video signal processing apparatus as claimed in claim 13, wherein the switch is located on the lever.

15. The video signal processing apparatus as claimed in claim 13, wherein the switch is located adjacent to the lever.

* * * * *